J. WILHELM.
GASOLENE GAGE.
APPLICATION FILED MAR. 3, 1921.
1,391,813.
Patented Sept. 27, 1921.
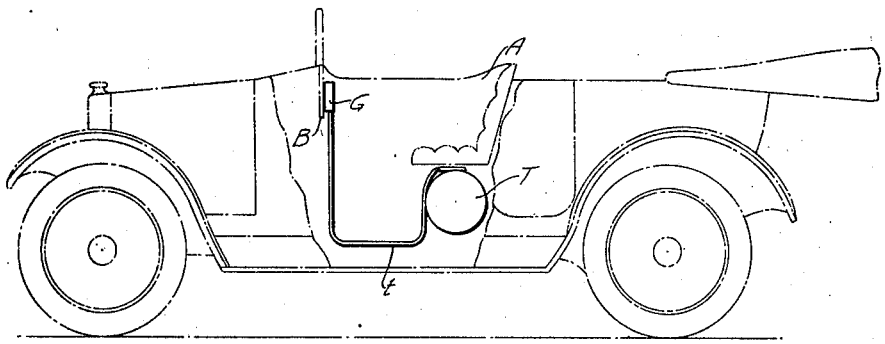
Fig.1.
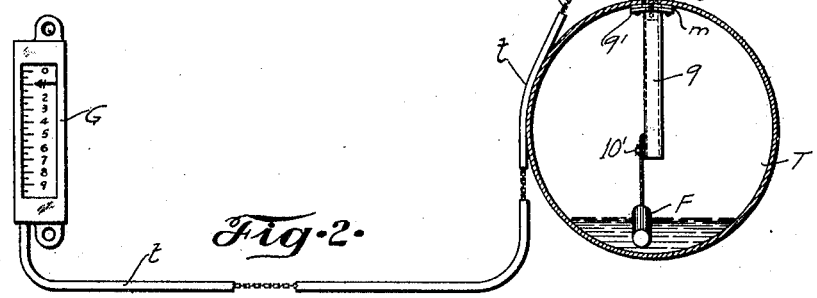
Fig.2.
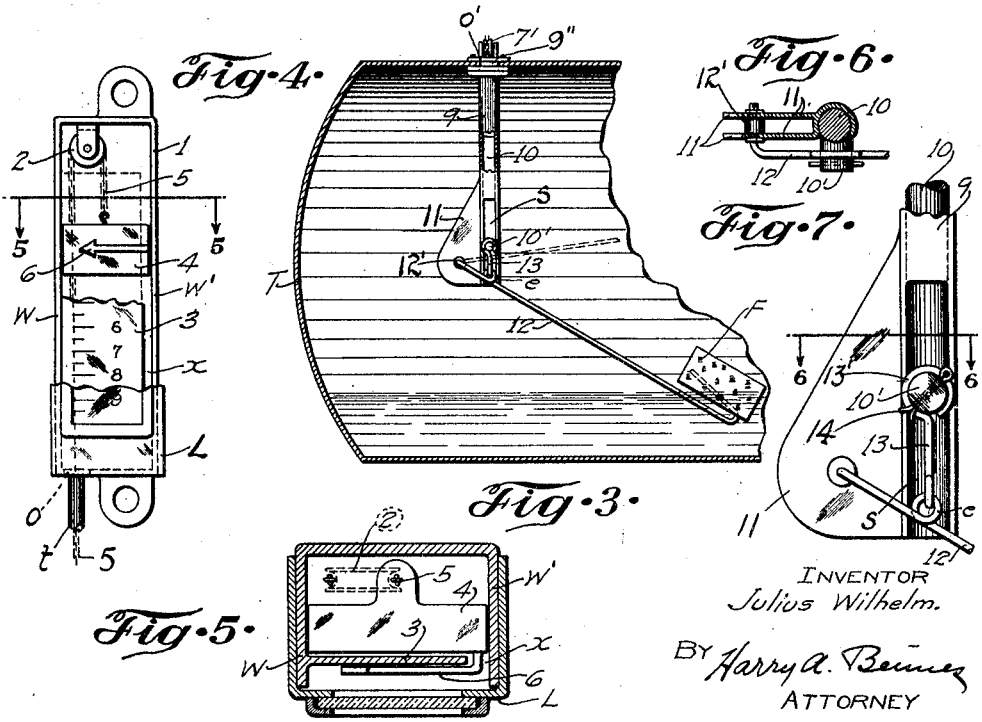
INVENTOR
Julius Wilhelm.
BY Harry A. Benner
ATTORNEY

UNITED STATES PATENT OFFICE.

JULIUS WILHELM, OF ST. LOUIS, MISSOURI.

GASOLENE-GAGE.

1,391,813.  Specification of Letters Patent.  Patented Sept. 27, 1921.

Application filed March 3, 1921. Serial No. 449,375.

*To all whom it may concern:*

Be it known that I, JULIUS WILHELM, a citizen of the United States, residing at St. Louis, State of Missouri, have invented certain new and useful Improvements in Gasolene-Gages, of which the following is a specification.

My invention has relation to improvements in gasolene gages for application to the fuel tanks of automobiles and consists in the novel details of construction more fully set forth in the specification and pointed out in the claim.

The object of the present invention is to provide a gasolene gage that will keep the driver constantly informed of the amount of gasolene in this tank. A further object is to provide a gasolene gage that will be positive in its operation; one that shall consist of few moving parts thereby lessening the probabilities of its getting out of order; one that may be readily applied to any automobile irrespective of the location of the tank. Further and other advantages will be better apparent from a detailed description of the invention in connection with the accompanying drawings in which—

Figure 1 is an outline view of an automobile with my invention applied thereto; Fig. 2 is a face view of the gage and its connections with the gasolene tank; Fig. 3 is an enlarged view of the float mechanism within the tank; Fig. 4 is an enlarged front view of the gage with parts broken away; Fig. 5 is an enlarged horizontal cross-section on the line 5, 5 of Fig. 4; Fig. 6 is a horizontal cross-section on the line 6, 6 of Fig. 7; and Fig. 7 is an enlarged view showing the connection of the float with gage operating mechanism.

Referring to the drawings A represents a conventional automobile provided with an instrument board B on which is suitably mounted my improved gage G having connection with the gasolene tank T through suitable tubing $t$.

The gage comprises a housing 1 having a pulley 2 mounted in the upper end thereof, and a scale plate 3 projecting from one side wall W and separated a small distance from the opposite side wall W' by a gap $x$. A weight 4 is suspended from a chain or cord 5, the latter passing over the pulley 2 and extending downwardly through the housing to the float mechanism as will presently appear. The weight 4 operates behind the scale plate 3, but a pointer 6 projects forwardly from the weight 4 and extends through the gap $x$ between the scale plate and wall W' and over the scale plate in a position to indicate thereon the number of gallons of gasolene within the tank. The chain 5 passes through an opening $o$ in the bottom of the housing 1 and then traverses the tube $t$ wherein the chain is confined but freely slidable. Adjacent the tank T a piece of insulating material $t'$ is inserted in the chain where the latter would otherwise come in contact with the tank T. The object of replacing the chain at this point with the insulation $t'$ is to prevent the chain from providing an electric circuit to the gasolene tank through which a current might pass and a spark be transmitted to the gasolene. Beyond the insulation $t'$ the chain 5 continues and is passed over pulleys 7 and 7' mounted between the legs of a U-shaped bracket 8, the latter being provided with a flange 8' by means of which it is secured to the tank T. A tube 9 provided with a flange 9' is secured to the inside of the tank T opposite the flange 8', and a gasket $m$ of cork or other suitable material is interposed between the tank wall and flange 9' to prevent the gasolene within the tank from leaking through the opening $o'$ in the tank wall through which opening extends the extremity 9'' of the tube 9. The outer end 9'' of the tube passes through the flange 8' of bracket 8, thus permitting the chain 5 to be passed into the tube 9 from the pulley 7' where one end of the chain is suitably secured to a rod 10 traversing the tube 9, the lower end of the rod 10 being bent outwardly at a right angle to form a projection 10' extending through an open slot $s$ in the lower end of the tube 9. The lower end of the tube 9 is also provided with a pair of wings 11, 11 disposed at an angle of ninety degrees with the slot $s$ and a comparatively long lever 12 is pivotally mounted at 12' in the wings 11, said lever being provided with an eye or loop $e$ opposite the slot $s$ and having a float F (preferably of cork) secured to its free end. A link 13 is connected at one end with the eye $e$ and terminates at the opposite end in a loop 13' enveloping the projecting extremity 10' of the rod 10, a cotter pin 14 being passed through the extremity 10' to prevent the link 13 from slipping off the end thereof.

From the foregoing it will be apparent that as the float F is raised on the surface of the liquid within the tank the lever 12 will be oscillated upwardly about 12' as a pivot and will raise with it the rod 10 through the link connection 13. As the rod 10 raises it will feed the chain 5 upwardly permitting it to travel on the pulleys 7' and 7, the necessary pull being exerted on the chain by means of the weight 4 secured to the opposite end. Of course, as the rod 10 is raised the weight 4 will be lowered and vice versa, the weight assuming a position corresponding to the level of liquid within the tank T. When the tank is full the weight will be at the bottom of the housing 1 indicating 10 gallons for a tank of that capacity, and when the tank is nearly empty the weight will be at the top of the housing 1 indicating whatever amount of gasolene there remains in the tank. Obviously other connections might be provided within the tank for actuating the weight and indicator of the gage, and I do not wish to restrict myself to the specific construction here shown, as it is within the scope of the present invention to provide any float actuated mechanism whereby the gage may be caused to operate.

Having described my invention I claim:

In combination with a fluid tank, a level gage mounted at a point removed from said tank, said gage comprising a housing having a scale plate extending from one wall thereof and spaced from the opposite wall, a weight suspended behind the scale plate and having a pointer operating through said space and extending over the scale plate, a pulley within the housing, a cord traversing said pulley and having one of its ends secured to the weight, means operable by the fluid within the tank for actuating the gage, said means comprising a tube mounted within the tank, a rod traversing the tube, a lever mounted on said tube and terminating in a float, a connecting link between the lever and rod, and the aforesaid cord having its other end secured to said rod.

In testimony whereof I hereunto affix my signature.

JULIUS WILHELM.